US009525687B2

(12) United States Patent
Patterson

(10) Patent No.: US 9,525,687 B2
(45) Date of Patent: Dec. 20, 2016

(54) TEMPLATE FOR CUSTOMER ATTRIBUTES

(71) Applicant: Wal-Mart Stores, Inc., Bentonville, AR (US)

(72) Inventor: David Patterson, Berkeley, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 13/730,538

(22) Filed: Dec. 28, 2012

(65) Prior Publication Data

US 2014/0189886 A1 Jul. 3, 2014

(51) Int. Cl.
*H04L 29/06* (2006.01)
*H04L 29/08* (2006.01)

(52) U.S. Cl.
CPC ............ *H04L 63/10* (2013.01); *H04L 63/108* (2013.01); *H04L 67/306* (2013.01)

(58) Field of Classification Search
CPC G06Q 30/0201; G06Q 30/0251; G06Q 30/00; G06Q 30/0277; G06Q 30/02; H04W 12/02; G06F 21/6245; H04L 67/306
USPC ..................................................... 726/26, 28
See application file for complete search history.

(56) References Cited

U.S. PATENT DOCUMENTS

| | | | |
|---|---|---|---|
| 5,873,069 A | 2/1999 | Reuhl | |
| 6,076,070 A | 6/2000 | Stack | |
| 6,477,521 B1 | 11/2002 | Kumomura et al. | |
| 6,493,722 B1 * | 12/2002 | Daleen et al. | |
| 6,732,081 B2 | 5/2004 | Nicholson | |
| 6,901,406 B2 | 5/2005 | Nabe et al. | |
| 6,947,902 B2 * | 9/2005 | Shah et al. | 705/7.33 |
| 7,069,231 B1 | 6/2006 | Cinarkaya et al. | |
| 7,099,833 B1 | 8/2006 | Sundaresan | |
| 7,100,195 B1 * | 8/2006 | Underwood | 726/2 |
| 7,200,607 B2 | 4/2007 | Downs | |
| 7,660,738 B1 | 2/2010 | Siegel | |
| 7,740,172 B1 | 6/2010 | Hubert | |
| 7,813,952 B2 | 10/2010 | Eskandari | |
| 7,979,366 B2 | 7/2011 | Sundararajan et al. | |
| 8,006,900 B2 | 8/2011 | Grigsby | |
| RE42,869 E | 10/2011 | Boe et al. | |
| 8,037,512 B2 * | 10/2011 | Wright et al. | 726/4 |
| 8,160,984 B2 | 4/2012 | Hunt | |
| 8,175,908 B1 | 5/2012 | Anderson | |
| 8,600,019 B1 * | 12/2013 | Cooper et al. | 379/93.03 |
| 8,606,746 B2 * | 12/2013 | Yeap et al. | 707/603 |
| 8,612,410 B2 * | 12/2013 | Meredith et al. | 707/705 |
| 8,615,422 B1 | 12/2013 | Alkasimi | |
| 8,675,071 B1 * | 3/2014 | Slavin et al. | 348/156 |
| 2001/0032115 A1 * | 10/2001 | Goldstein | 705/10 |
| 2004/0048605 A1 * | 3/2004 | Schaefer et al. | 455/414.2 |
| 2005/0036598 A1 * | 2/2005 | Hirschman et al. | 379/114.04 |
| 2005/0160014 A1 | 7/2005 | Moss | |
| 2005/0273842 A1 * | 12/2005 | Wright et al. | 726/1 |

(Continued)

FOREIGN PATENT DOCUMENTS

WO WO2013159152 A1 10/2013

*Primary Examiner* — John B King
(74) *Attorney, Agent, or Firm* — Bryan Cave LLP

(57) ABSTRACT

The present disclosure extends to methods, systems, and computer program products for establishing an attribute template for a customer for distribution to third party recipients. In operation, customer information is received and placed as attributes in a template that is then made available to predetermined recipients.

20 Claims, 6 Drawing Sheets

(56) References Cited

U.S. PATENT DOCUMENTS

| | | |
|---|---|---|
| 2007/0265914 A1 | 11/2007 | McClung |
| 2008/0073429 A1 | 3/2008 | Oesterling |
| 2009/0018965 A1 | 1/2009 | Neydavood |
| 2009/0052751 A1* | 2/2009 | Chaney et al. ............... 382/120 |
| 2011/0196716 A1 | 8/2011 | Srinivasan et al. |
| 2012/0221430 A1 | 8/2012 | Naghmouchi |
| 2013/0030898 A1 | 1/2013 | Burton |
| 2013/0246143 A1 | 9/2013 | Hunt |
| 2013/0317896 A1 | 11/2013 | Liberty |
| 2014/0188550 A1 | 7/2014 | Patterson |

* cited by examiner

TEMPLATE FOR CUSTOMER ATTRIBUTES

BACKGROUND

Advances in technology have provided large amounts of information to be gathered in the form of data about the lives and behaviors of customers. This information may be valuable to other persons and organizations, but in its raw form it is hard to convey in a sensible and valuable manner such that the information can be used in a beneficial way.

What is needed are methods and systems that are efficient at organizing relevant information about customers' attributes, and also effective methods and systems to convey this information in a form that other parties could use in order to influence a customer to buy goods and services. As will be seen, the disclosure provides methods and systems that can do this in an efficient and elegant manner.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
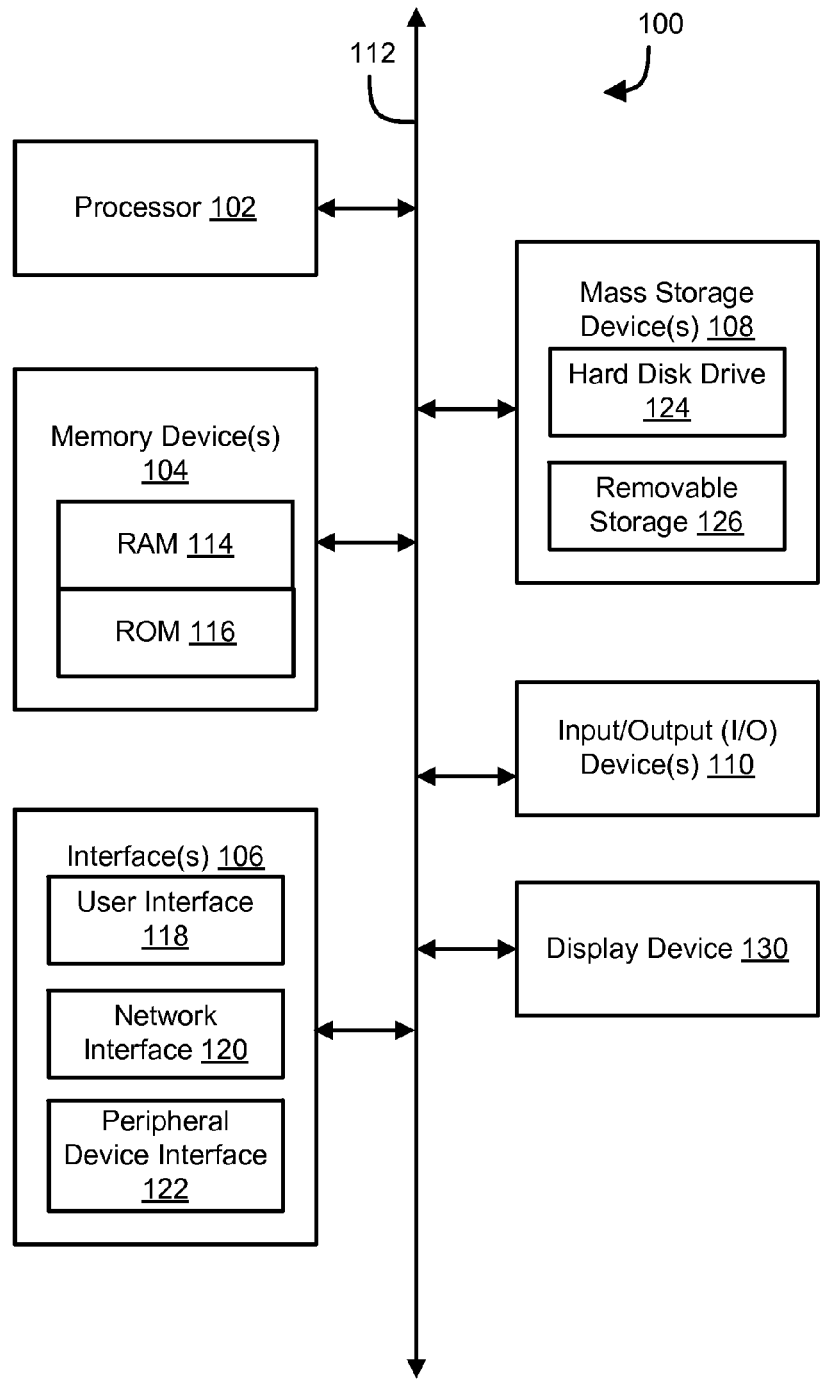
FIG. 1 illustrates an example block diagram of a computing device.

The present disclosure extends to methods, systems, and computer program products for conveying information about customer attributes based on customer provided information and other related information from the customer's activity on a merchant's networks or within a merchant's retail location. In the following description of the present disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure.

Implementations of the present disclosure may comprise or utilize a special purpose or general-purpose computer including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures that can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. It should be noted that any of the above mentioned computing devices may be provided by or located within a brick and mortar location. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the disclosure can also be used in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, e.g., on-demand self-service, broad network access, resource pooling, rapid elasticity, measured service, or any suitable characteristic now known to those of ordinary skill in the field, or later discovered), service models (e.g., Software as a Service (SaaS), Platform as a Service (PaaS), Infrastructure as a Service (IaaS), and deployment models (e.g., private cloud, community cloud, public cloud, hybrid cloud, or any suitable service type model now known to those of ordinary skill in the field, or later discovered). Databases and servers described with respect to the present disclosure can be included in a cloud model.

As used herein, the terms "customer" and "user" are used interchangeably, and are intended to denote that a customer can be both contemplated in a brick and mortar retail location as well as a customer who is a user on a computing device.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 may include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
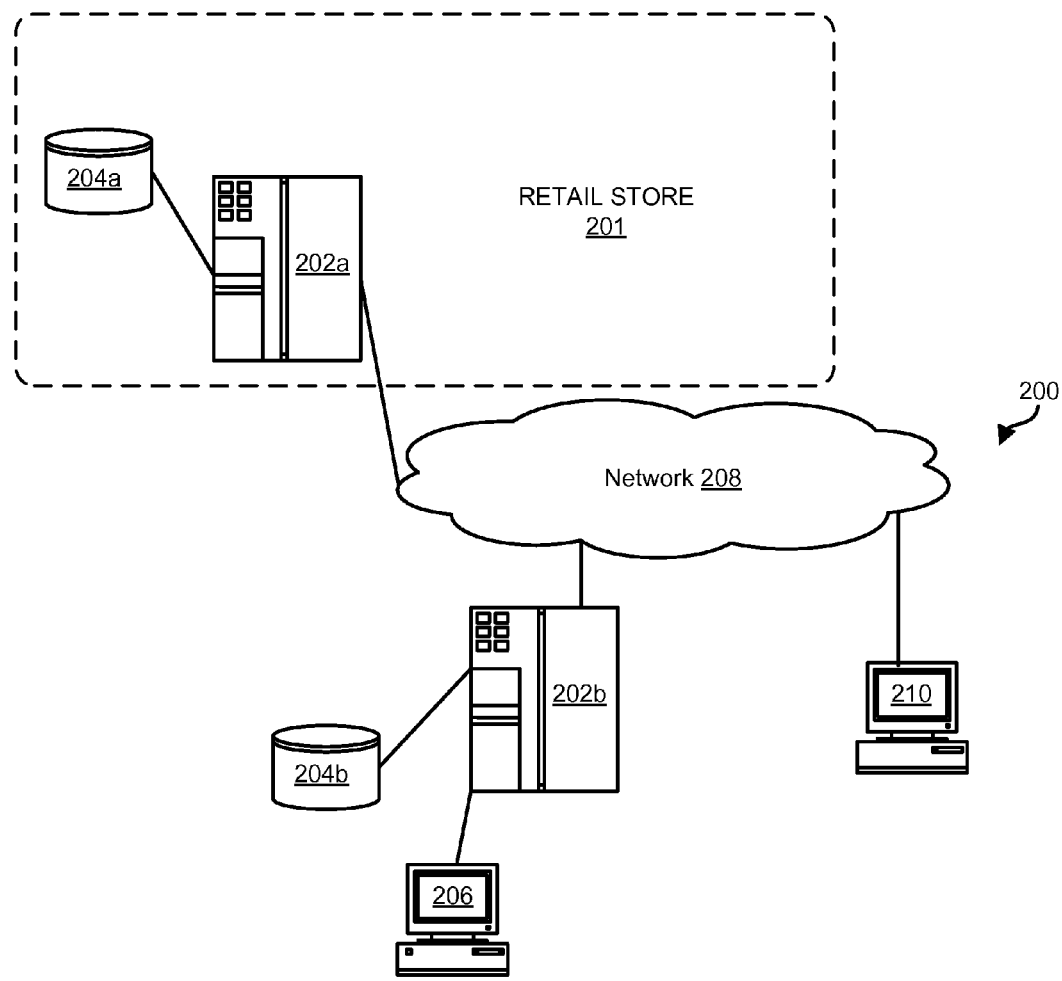
FIG. 2 illustrates an example retail location and computer architecture that facilitates different implementations described herein.

FIG. 2 illustrates an example of a computing environment 200 and a brick and mortar retail location 201 suitable for implementing the methods disclosed herein. In some implementations, a server 202a provides access to a database 204a in data communication therewith, and may be located and accessed within a brick and mortar retail location. The database 204a may store customer attribute information such as a user profile as well as a list of other user profiles of friends and associates associated with the user profile. The database 204a may additionally store attributes of the user associated with the user profile. The server 202a may provide access to the database 204a to users associated with the user profiles and/or to others. For example, the server 202a may implement a web server for receiving requests for data stored in the database 204a and formatting requested information into web pages. The web server may additionally be operable to receive information and store the information in the database 204a.

A server 202b may be associated with a merchant or by another entity or party providing gift recommendation services. The server 202b may be in data communication with a database 204b. The database 204b may store information regarding various products. In particular, information for a product may include a name, description, categorization, reviews, comments, price, past transaction data, and the like. The server 202b may analyze this data as well as data retrieved from the database 204a in order to perform methods as described herein. An operator or customer/user may access the server 202b by means of a workstation 206, which may be embodied as any general purpose computer, tablet computer, smart phone, or the like.

The server 202a and server 202b may communicate with one another over a network 208 such as the Internet or some other local area network (LAN), wide area network (WAN), virtual private network (VPN), or other network. A user may access data and functionality provided by the servers 202a, 202b by means of a workstation 210 in data communication with the network 208. The workstation 210 may be embodied as a general purpose computer, tablet computer, smart phone or the like. For example, the workstation 210 may host a web browser for requesting web pages, displaying web pages, and receiving user interaction with web pages, and performing other functionality of a web browser. The workstation 210, workstation 206, servers 202a-202b, and databases 204a, 204b may have some or all of the attributes of the computing device 100.

Figure 3:
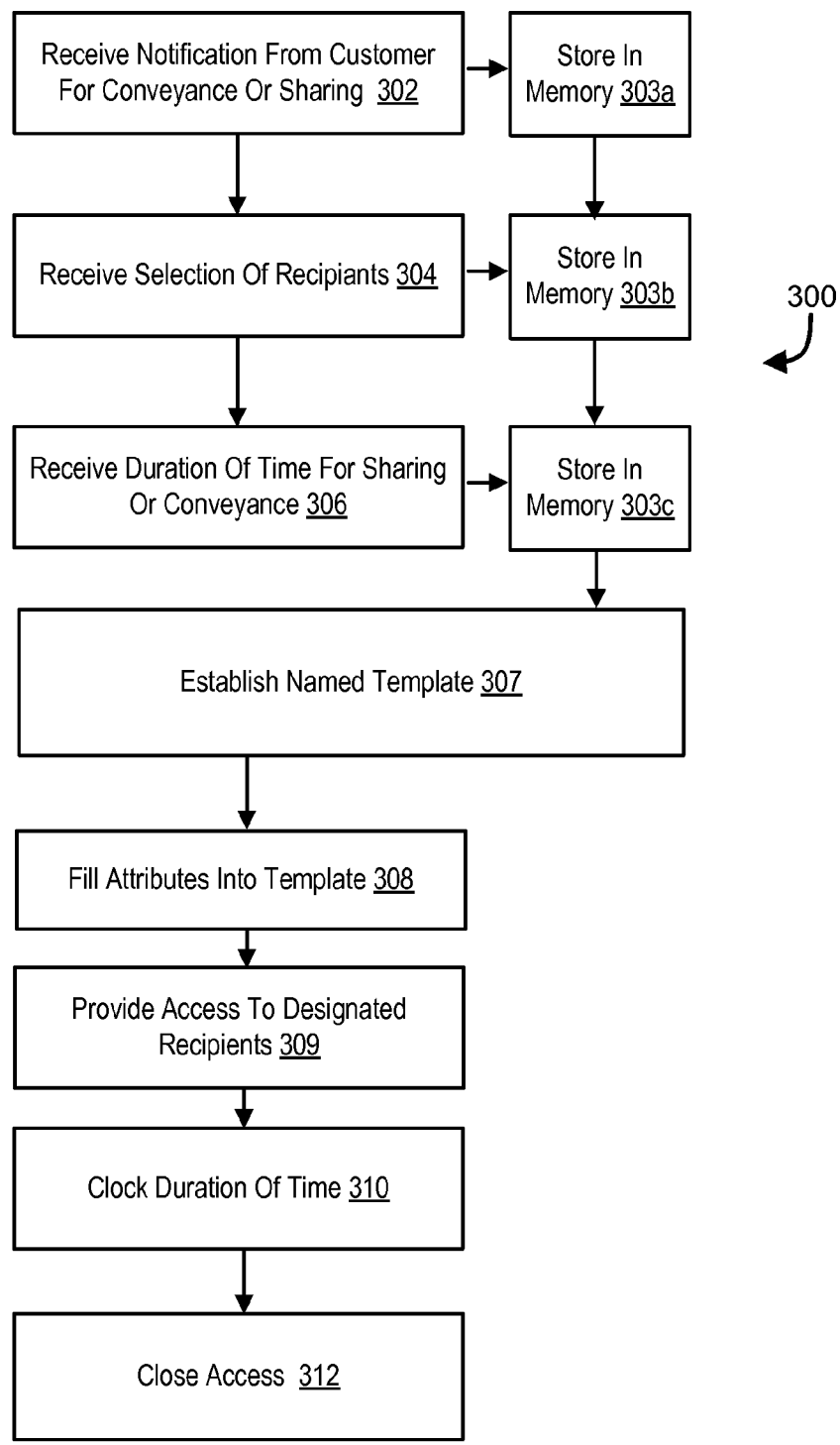
FIG. 3 illustrates a flow chart of an example method according to one implementation.

With reference primarily to FIG. 3, an implementation of a method 300 for creating a template for conveying customer attributes will be discussed. FIG. 1 and FIG. 2 may be referenced secondarily during the discussion in order to provide hardware support for the implementation. The disclosure aims to disclose methods and systems to allow customer data to be organized into a useable format within a template that can be conveyed to an other party or third party recipient as directed by a user or customer. In other words, a customer may select a selection of third party recipients to which the customer would like its own information conveyed, in order to receive a beneficial relationship with the third party recipients, or for any other useful purpose. Additionally, the customer can specify the duration that a third party, or plurality of third party recipients, will have access to the customer information.

Accordingly, the method 300 may include the database 204a (or any suitable memory device disposed in communication with the network 208) receiving notification 302 from a customer that the customer would like to convey, or allow access to, the customer's attributes to a third party recipient. At 303a the notification may be stored in memory associated with a customer profile. The notification by the customer may be solicited by a merchant, and may be received over a computer network that both the customer and merchant are connected to. Additionally, the notification may be made in person at a retail location of the merchant. Either on-line or in-store, a database 204a (or any suitable memory device disposed in communication with the network 208) used as part of the method 300 may receive a selection of third party recipients 304 to whom a template of attributes can be distributed.

In an implementation, the customer may input from memory the identities of potential third party recipients, or may select the desired third party recipients from a list presented to them by a merchant. In the latter case, the selection by the customer may be made by directly communicating with a representative of the merchant in real time or with a communication device to enable delayed communication such as via e-mail or other suitable communication device, or on-line from a web page type interface having input and output options as discussed above. The customer may also determine a list of possible attributes to be conveyed that may include such things as: identities, legal documents, images of the customer, utility bills, home address, work history, pay check stubs, car registrations, and/or any other type of attribute information normally used to establish a person's identity. The selection may be made by common computer I/O means such as, example I/O device(s) that may include cursor control devices, keyboards, keypads, microphones, monitors or other display devices, speakers, printers, network interface cards, modems, lenses, CCDs or other image capture devices, and the like. At 304, the selection made by a customer inputting or choosing the third party recipients they wish to allow access to, is received and stored in memory 303b.

At 306, a duration of time that the designated third party recipients are allowed access may be received from the customer and recorded into memory 303c. It should be noted, that third party recipients may be allowed to access the attribute information of a user or customer, or alternatively, the merchant may actually convey the attributes directly to the third party recipients either with or without prompting by the third party recipients. In any forgoing happenstance, once the duration designated by the customer has elapsed, access to the attribute data is to be terminated. In an implementation where the attributes are conveyed in a template, the template file may be deleted in order to terminate access to the attribute data. In an implementation where access is granted to a third party recipient, the access may simply be denied once the duration of time has elapsed. Any suitable manner known to those skilled or ordinary skill in the field, for terminating a third party recipient's access to the attribute data, such when the duration specified or designated by the customer has occurred, may be used.

The computing device 100, within a computer environment 200 utilized by the method may then generate or establish a template 307 that may be correlated to a form that is specified by the customer and then stored on a server. It should be noted that a template may comprise attributes in various forms. For example, a template may be predetermined such that it contains such information as: age, education, income, image of customer, gender of customer, home ownership, and/or marital status. An implementation, may comprise a template that contains documents, or portions of documents, where the customer specifies the type and order of the documents in the template. A non-limiting example may be a customer that is seeking a loan from a third party lender. In the present example, a lender may wish to receive a template having documents therein such as pay stubs, debts, investments and other like documents for determining the financial condition of a customer. Accordingly, the template of the present example may comprise attributes such as age, address, education, work of the customer, and would also contain attributes in the form of the documents to be conveyed as discussed above. It can be seen by those in the art, that a template may be small or may be very large, and that a template can vary depending on the desires of the customer, third party recipient and/or the merchant.

Additionally, the template may comprise the notification recorded into memory at 303a, the selections of recipients recorded into memory at 303b, and the duration of access recorded into memory 303c.

Once the template has been established as discussed above, the method may involve the step of the computing device 100 within a computing environment 200 then filling in the template with the desired attributes at 308. At 309, access may then be granted to the designated third party recipients and at 310 a clock (not shown) that is part of computing device 100 within computing environment 200 could begin to run for the duration of time designated at 306 of method 300. The clock may run automatically within the computing system of a network as known to those of ordinary skill in the field, and the clock may be a commonly used timing circuit within the computing device 100. At 312, access to the template may be closed once the duration of time has elapsed as discussed above.

Figure 4:
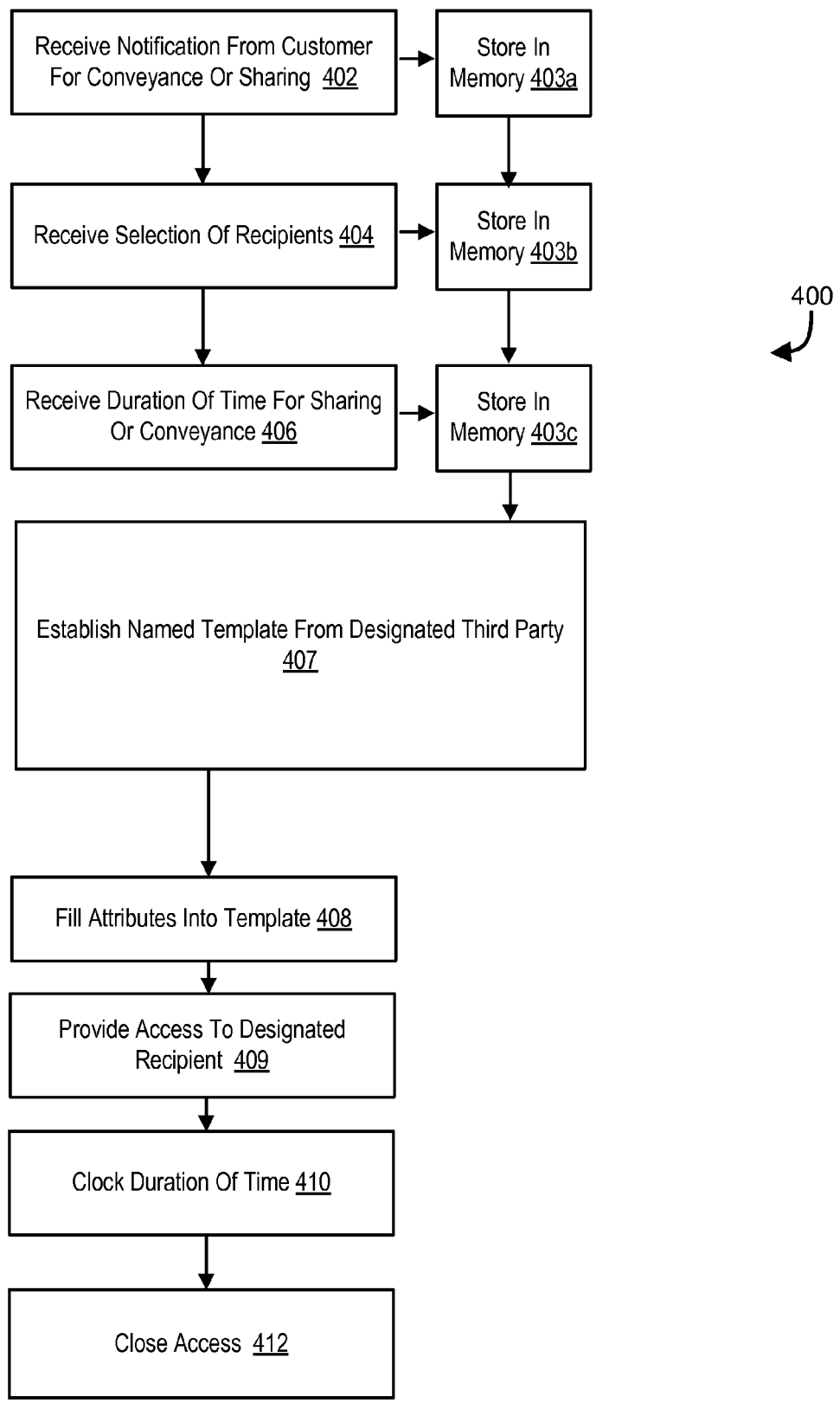
FIG. 4 illustrates a flow chart of an example method according to one implementation.

With reference primarily to FIG. 4, an implementation of a method 400 for creating a template for conveying customer attributes wherein a designated third party recipient may dictate the form of the template, will be discussed. FIG. 1 and FIG. 2 may be referenced secondarily during the discussion in order to provide hardware support for the implementation, and the connections and interrelatedness within the networking and computing relationships described above in discussion of FIG. 3 are hereby deemed to apply to the following descriptions in relation to FIG. 4. The disclosure aims to illustrate methods and systems to allow customer data to be organized into a useable format in a template that can be conveyed to a third party recipient as directed by a customer. In other words, a customer may select a selection of third party recipients to which the customer would like its own information conveyed, in order to receive a beneficial relationship with the third party recipients, or for any other useful purpose. Additionally, the customer can specify the duration that a third party, or plurality of third party recipients, will have access to the customer information within a template having a form designated by the third party recipients.

Accordingly, the method 400 may include receiving notification 402 from a customer that the customer would like to convey, or allow other to convey, or allow access to, the customer's attributes. At 403a, the notification may be stored in memory associated with a customer profile. The notification by the customer may be solicited by a merchant, and may be received over a computer network that both the customer and merchant are connected to. Additionally, the notification may be made in person at a retail location of the merchant. Either on-line or in-store, the method 400 may receive a selection of recipients 404 for the desired possible third party recipients.

In an implementation, the customer may be selecting the desired third party recipients from a list presented to them by a merchant. The selection by the customer may be made by directly communicating with a representative of the merchant, or may be made on-line from a web page type interface having input and output options as discussed above. As will be discussed below, the designated third party recipients may determine a list of required attributes to be included in a template and conveyed that may include such things as: identities, legal documents, images of the customer, utility bills, home address, work history, pay check stubs, car registrations, and/or any other type of attribute information normally used to establish a person's identity.

At 404, the selection made by a customer for the third party recipients they wish to allow access to is received and stored in memory 403b. At 406, a duration of time that the designated third party recipients are allowed access may be specified by the third party recipients and recorded into memory 403c. It should be noted, that third party recipients may be allowed to access the attribute information of a user, or alternatively, the merchant may actually convey the attributes to the third party recipients. In either happenstance, once the duration has elapsed, access to the attribute data is to be terminated. In an implementation where the attributes are conveyed in a template, the template file may simply be deleted. In an implementation where access is granted to a third party recipient, the access may simply be denied once the duration of time has elapsed.

The method may then generate or establish a template 407 that may be correlated to a form that is specified by the receiving third party and stored on a server. It should be noted that a template may comprise attributes in various forms. For example, a template may be predetermined such that it contains such information as: age, education, income, image of customer, gender of customer, home ownership, and/or marital status. An implementation, may comprise a template that contains documents, or portions of documents, where a designated third party recipient specifies the type and order of the documents in the template. A non-limiting example may be a customer that is seeking a loan from a third party lender. In the present example, a lender may wish to receive a template having documents therein such as pay stubs, debts, investments and other like documents for determining the financial condition of a customer. Accordingly, the template of the present example may comprise attributes such as age, address, education, work of the customer, and would also contain attributes in the form of the documents to be conveyed. It can be seen by those in the art, that a template may be small or may be very large, and that a template can vary depending on the desires of the customer, third party and the merchant.

Additionally, the template may comprise the notification recorded into memory at 403a, the selections of recipients recorded into memory at 403b, and the duration of access recorded into memory 403c.

Once the template has been established as discussed above, the method may then fill in the template with the desired attributes at 408. At 409, access may then be granted to the designated third party recipients and at 410 a clock begins to run for the duration of time designated at 406 of method 400. The clock may run automatically within the computing system of a network and the clock may be a commonly used timing circuit within the computing system. At 412, access to the template may be closed to the third party recipients once the duration of time has elapsed as discussed above.

Figure 5:
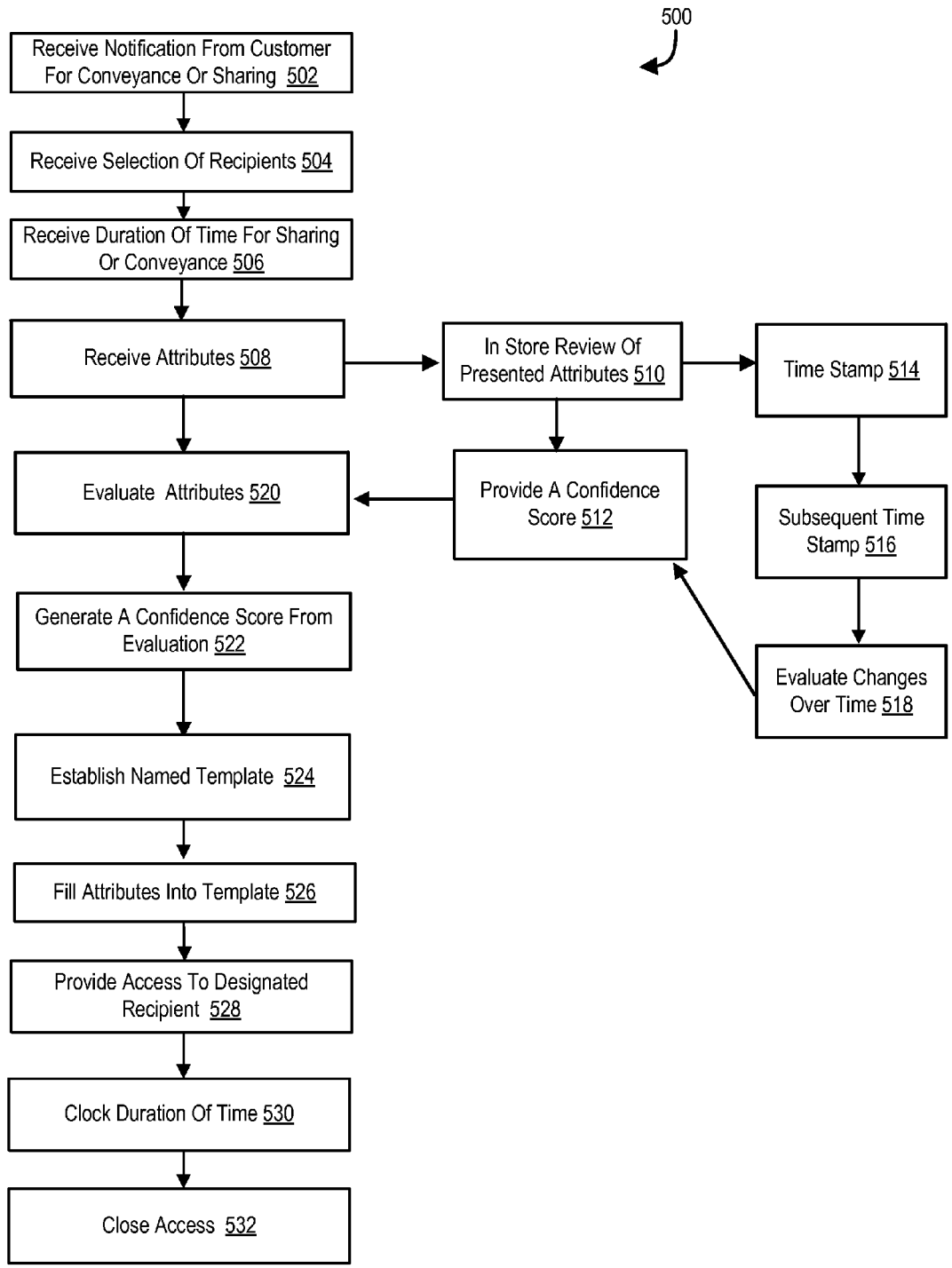
FIG. 5 illustrates a flow chart of an example method according to one implementation.

With reference primarily to FIG. 5, an implementation of a method 500 for creating a template for conveying customer attributes wherein the customer attributes are evaluated as they change over time, and for the quality of the attribute, will be discussed. FIG. 1 and FIG. 2 may be referenced secondarily during the discussion in order to provide hardware support for the implementation, and the connections and interrelatedness within the networking and computing relationships described above in discussion of FIG. 3 are hereby deemed to apply to the following descriptions in relation to FIG. 5. Accordingly, the method 500 may include receiving notification 502 from a customer that the customer would like to convey, or allow access to, the customer's attributes. The notification by the customer may be solicited by a merchant, and may be received over a computer network that both the customer and merchant are connected to. Additionally, the notification may be made in person at a retail location of the merchant. Either on-line or in-store, the method 500 may receive a selection of recipients 504 for the desired possible third party recipients.

In an implementation, the customer may be selecting the desired third party recipients from a list presented to them by a merchant. The selection by the customer may be made by directly communicating with a representative of the merchant, or may be made on-line from a web page type interface having input and output options as discussed above. As will be discussed below, the designated third party recipients or the customer may determine a list of desired attributes to be conveyed that may include such things as: identities, legal documents, images of the customer, utility bills, home address, work history, pay check stubs, car registrations, and/or any other type of attribute information normally used to establish a person's identity.

At 506, a duration of time that the designated third party recipients are allowed access may be specified by the third party recipients or by the customer and recorded into memory. It should be noted, that third party recipients may be allowed to access the attribute information of a user, or alternatively, the merchant may actually convey the attributes to the third party recipients. In either happenstance, once the designated duration has elapsed, access to the attribute data is to be terminated. In an implementation where the attributes are conveyed in a template, the template file may be deleted. In an implementation where access to a template is granted to a third party, the access may simply be denied once the duration of time has elapsed.

At 508 of method 500, attributes may be input into the system by a customer or by receiving attribute information from other sources. In an implementation, various documents may be presented by a customer either in person at a retail location, or on-line wherein the attribute information is presented digitally. Furthermore, the attribute information from a customer may be digital in form and may comprise digital copies of such things as: State issued ids, legal documents, images of the customer, utility bills, home address, work history, pay check stubs, car registrations, and/or any other type of attribute information normally used to establish a person's identity. Additionally, a customer/user at a computer terminal may be able to enter attribute data in order to fill-in fields that represent the selection of attributes. The information provided, either digitally or in the retail location, may then be reviewed 510 in the retail location for content and quality.

The method may then generate a confidence score 512, based on review 510, that may be correlated to the quality and nature of the customer provide attributes and items. For a non-limiting example, a utility bill may be presented by a customer to provide attributes, and a digital copy may be received from the customer over a network. A merchant representative or a computer and/or server may review 510 the utility bill for customer attribute information. The evaluation may be to authenticate the utility bill as real, and/or gather information from the utility bill such as name, address, usage, length of time for billing relationship, and other like information. In the present example, the system may then generate a confidence score 512 for the utility bill based on the review, and then enter the confidence score into the template when the template is established at 524 of method 500. It is also a feature and aspect of the present disclosure to provide the ability for a merchant to track how customer attributes may change over time. Accordingly, method 500 may provide the feature of tracking change over time, by comparing attribute information received into the system at a time stamp 514 to additional attribute information received into the system at a subsequent time stamp 516.

At 514, the attribute data received into the system may be time stamped in order to provide the additional information about when a customer has entered attribute data. Time stamp data can be used to provide timeliness information about a customer for such uses as, for example, providing timely recommendations for seasonal items and services. At 516, subsequent time stamp data may be associated with additional attribute information received by the system. At 518, the attribute change between the time stamp of 514 and 516 may be evaluated and recorded in a template. The information provided by a customer and the attribute change data provided at 518 may then be evaluated 520 such that a confidence score is assigned 522 based on the quality of the attributes and the change of the attributes overtime.

The method may then generate or establish a template 524 that may be correlated to a form that is specified by the receiving third party or as desired by the customer and stored on a server. It should be noted that a template may comprise attributes in various forms. For example, a template may be predetermined such that it contains such information as: age, education, income, image of customer, gender of customer, home ownership, and/or marital status. An implementation, may comprise a template that contains documents, or portions of documents, where a designated third party specifies the type and order of the documents in the template. Accordingly, the template of the present example may comprise attributes such as age, address, education, work of the customer, and would also contain attributes in the form of the documents to be conveyed. It can be seen by those in the art, that a template may be small or may be very large, and that a template can vary depending on the desires of the customer, third party and the merchant.

It should be noted that the template may be organized by category of attribute such as, for example, demographics, personally identifiable information (PII), interests, work, clubs and any other category that may be useful in a template that is to be conveyed to a third party recipient. Additionally, in an implementation a customer may be presented with all of the attributes and customer items that the merchant has for the customer, and the customer designates the attributes and items for inclusion in the template.

Additionally, the template may comprise the notification recorded into memory, the selections of recipients recorded into memory, and the duration of access recorded into memory, change over time information, a confidence score regarding the change over time, and a confidence score for attribute quality. In an implementation, it may be desirable for the merchant to provide the confidence scores within the template, while in another implementation the confidence score may not be provided to customer or any third party recipients.

Once the template has been established as discussed above, the method may then fill in the template with the desired attributes and attribute information at 526. At 528, access may then be granted to the designated third party recipients and at 530 a clock begins to run for the duration of time designated at 506 of method 500. The clock may run automatically within the computing system of a network and the clock may be a commonly used timing circuit within the computing system. At 532, access to the template may be closed once the duration of time has elapsed as discussed above.

Figure 6:
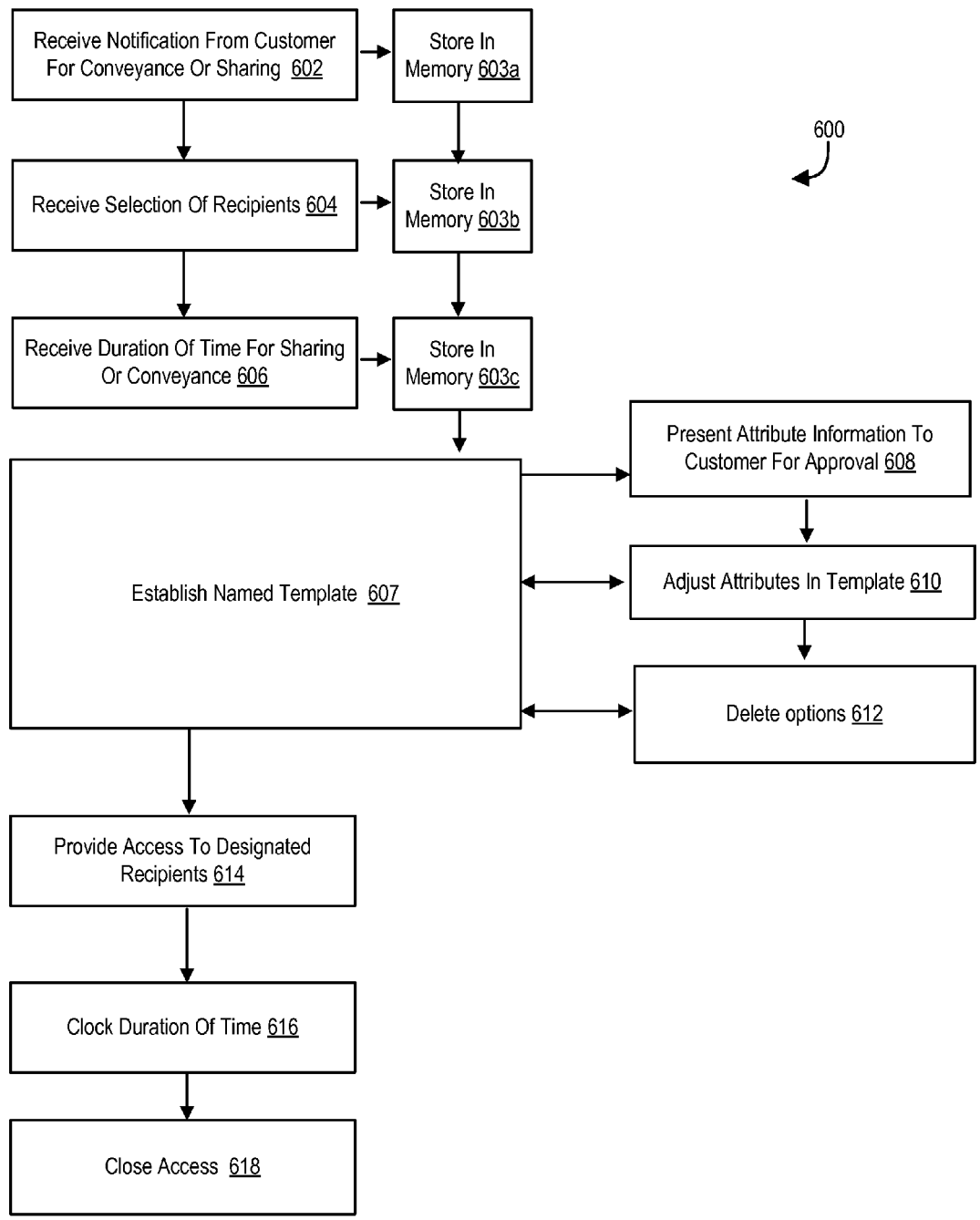
FIG. 6 illustrates a flow chart of an example method according to one implementation that considers changes over time.

With reference primarily to FIG. 6, an implementation of a method 600 for creating a template for conveying customer attributes will be discussed. FIG. 1 and FIG. 2 may be referenced secondarily during the discussion in order to provide hardware support for the implementation, and the connections and interrelatedness within the networking and computing relationships described above in discussion of FIG. 3 are hereby deemed to apply to the following descriptions in relation to FIG. 4. The disclosed implementation aims to disclose methods and systems to allow customer attributes to be organized into a useable format within a template that can be conveyed to a third party as directed by a user or customer. Additionally, the customer, third party and merchant may visually organize the information of the template as desired.

Accordingly, the method 600 may include receiving notification 602 from a customer that the customer would like to convey, or allow access to, the customer's attributes. At 603a the notification may be stored in memory associated with a customer profile. The notification by the customer may be solicited by a merchant, and may be received over a computer network that both the customer and merchant are connected to. Additionally, the notification may be made in person at a retail location of the merchant. Either on-line or in-store, the method 600 may receive a selection of third party recipients 604.

In an implementation, the customer may be selecting the desired third party recipients from a list presented to them by a merchant. The selection by the customer may be made by directly communicating with a representative of the merchant, or may be made on-line from a web page type interface having input and output options as discussed above. The customer may also determine list of possible attributes, that may be derived from customer items previously received and reviewed by the merchant, to be conveyed that may include such things as: identities, legal documents, images of the customer, utility bills, home address, work history, pay check stubs, car registrations, and/or any other type of attribute information normally used to establish a person's identity. The selection may be made by common computer I/O means such as, example I/O device(s) that may include cursor control devices, keyboards, keypads, microphones, monitors or other display devices, speakers, printers, network interface cards, modems, lenses, CCDs or other image capture devices, and the like. At 604 the selection made by a customer for the third party recipients they wish to allow access to, is received and stored in memory 603b.

At 606, a duration of time that the designated third party recipients are allowed access is received from the customer and recorded into memory 603c. It should be noted, that third party recipients may be allowed to access the attribute information of a user, or alternatively, the merchant may actually convey the attributes to the third party recipients. In either happenstance, once the duration designated by the customer has elapsed, access to the attribute data is to be terminated.

The method may then generate or establish a template 607 that may be adjusted by the customer and then stored on a server. It should be noted that a template may comprise attributes and items in various forms as discussed above. For example, a template may be presented to a customer (or user, if the customer is not directly involved in an implementation) for review and approval at 608 of method 600. The presentation may be performed by a computer display whereby a customer is shown how the customer attributes appear in the template established at 607. After the customer has viewed the template, the customer may adjust or organize the template 610 to better convey the attributes of the customer. The adjustment 610 may be performed through any I/O devices as discussed above, and may provide a 'what you see is what you get' arrangement so that a customer and third party see the same organization of attributes. In an implementation, a customer may be able to delete 612 attributes they do not want to be conveyed within the template to a third party recipient by graphically removing them on the display.

In an implementation, several iterations may be performed to allow a customer to fine tune the template, for example, a customer may make an adjustment 610 to the template and then be presented with the adjusted template for review and approval 608, or the template may be reestablished 407 after a deletion 612 of an attribute for a subsequent review and approval 608. Once the customer or user has the template in a desirable form access may then be granted 614 to the designated third party recipients and at 616 a clock begins to run for the duration of time designated at 606 of method 600. The clock may run automatically within the computing system of a network and the clock may be a commonly used timing circuit within the computing system. At 618, access to the template may be closed once the duration of time has elapsed as discussed above.

Thus the disclosure provides a method and system for establishing a template for conveying customer attributes by considering the desires and the requirements of third party recipients' and customers. Additionally, the disclosure allows a user (customer or merchant) to adjust the template before it is shared to a designated third party. The disclosure also provides for the templates to comprise confidence scores for the attributes therein, and allows attributes of the template to be evaluated over time.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The invention claimed is:
1. A method for conveying customer attributes of a customer of a merchant to a third party lender, the method comprising:
receiving a notification from the customer requesting that one or more of the customer attributes in a customer profile representative of the customer be made available to the third party lender in a template, wherein:
the customer is seeking a loan from the third party lender;

a selection of the one or more of the customer attributes to be included in the template is predetermined at least in part by a form provided by the third party lender;

the one or more of the customer attributes in the customer profile are electronically stored by the merchant that is different from the customer and the one or more of the customer attributes are based at least in part on activity of the customer on a computer network of the merchant; and the template allows the one or more of the customer attributes to be organized into a useable format that can be conveyed to the third party lender as directed by the customer in order to receive a beneficial relationship between the customer and the third party lender;

evaluating the one or more of the customer attributes over time after the customer has updated the one or more of the customer attributes;

after evaluating the one or more of the customer attributes over time, evaluating the one or more of the customer attributes for quality by determining that one or more digital copies of documents that include at least one of the one or more of the customer attributes are authentic;

providing a confidence score based at least in part on the quality and the evaluation of the one or more of the customer attributes over time;

presenting to the customer a group of selectable third party lenders to which the customer profile is to be made available, the group of selectable third party lenders comprising the third party lender;

using an on-line web page interface having input and output options, receiving a selection by the customer of the third party lender for access to the customer profile;

receiving a duration of access that the customer would like the customer profile to be available for access by the third party lender for which the selection was received by using the on-line web page interface;

storing the selection of the third party lender in memory of a server;

storing the duration of access in the memory of the server;

establishing the template for the one or more of the customer attributes of the customer corresponding to the selection of the third party lender and the duration of access;

filing in the template, by the server, with the selection of the one or more of the customer attributes that are predetermined at least in part by the form provided by the third party lender;

with the server, providing access to the third party lender to the temple for the duration of access based on a time clock, wherein the template comprises the selection of the one or more of the customer attributes that is predetermined at least in part by the form provided by the third party lender;

providing the third party lender access to the confidence score; and with the server, denying access to the template to the third party lender after the duration of access has passed based on the time clock.

2. The method according to claim 1, wherein the template is predefine to comprise a group of customer attributes of: age of the customer, education of the customer, income of the customer, photo of the customer, gender of the customer.

3. The method according to claim 2, wherein the template is predefined to comprise the an additional group of the customer attributes of: home ownership status of the customer, and marital status of the customer.

4. The method according to claim 1, further comprising:
presenting to the customer a selectable selection of customer items that contain the one or more of the customer attributes that have been provided by the customer;
receiving a selected selection of the customer items made by the customer; and
evaluating the selected selection for the one or more of the customer attributes.

5. The method according to claim 4, further comprising:
organizing the items in the selected selection on a display; and
presenting the display to the customer.

6. The method according to claim 5, wherein the customer is provided an option of deleting one or more of the customer items from the selected selection by removing the one or more of the customer items graphically from the display.

7. The method according to claim 6, wherein the third party lender is presenting with the selected selection of the customer items in a same organization as is displayed on the display.

8. The method according to claim 1, further comprising:
presenting to the customer a selectable selection of customer items that contain the one or more of the customer attributes that have been provided by the customer;
receiving a selected selection of the customer items made by the customer;
evaluating the customer items in the selected selection for the one or more of the customer attributes;
organizing the customer items in the selected selection on a display; and presenting the display to the customer;
wherein:
the template is predefined to comprise a group of the customer attributes of: age of the customer, education of the customer, income of the customer, photo of the customer, and gender of the customer;
the template is predefined to further comprise an additional group of the customer attributes of: home ownership status of the customer, and marital status of the customer;
the customer is provided an option of deleting one or more of the customer items from the selection by removing the one or more of the customer items graphically from the display; and
the third party lender is presented with the selection of the customer items in a same organization as is displayed on the display.

9. A system for providing customer attributes of a customer of a merchant, the system comprising: one or more processors and one or more memory devices operably coupled to the one or more processors and storing executable and operational data, the executable and operational data effective to cause the one or more processors to:
receive a notification from the customer requesting that one or more of the customer attributes in a customer profile representative of the customer be made available to third party recipients in a template, wherein:
the customer is seeking a loan from the third party recipients;
a selection of the one or more of the customer attributes to be included in the template is predetermined at least in part by a form provided by one of the third party recipients;

the one or more of the customer attributes in the customer profile are electronically stored by the merchant, that is different from the customer, and the one or more of the customer attributes are based at least in part on activity of the customer on a computer network of the merchant; and the template allows the one or more of the customer attributes to be organized into a useable format that can be conveyed to the third party recipients as directed by the customer in order to receive a beneficial relationship between the customer and at least one of the third party recipients;

evaluate the one or more of the customer attributes over time after the one or more of the customer has updated the customer attributes;

after evaluating the one or more of the customer attributes over time, evaluate the one or more of the customer attributes for quality by determining that one or more digital copies of documents that include at least one of the customer attributes are authentic;

provide a confidence score based at least in part on the quality and the evaluating the one or more of the customer attributes over time;

present to the customer the third party recipients to which the customer profile can be made available;

using an on-line web page interface having input and output options, receive a selection by the customer of the third party recipients for access to the customer profile;

using the on-line web page interface, receive a duration of access that the customer would like the customer profile to be available for access by the selection by the customer of the third party recipients;

store the selection by the customer of the third party recipients in memory of a server;

store the duration of access in the memory of the server;

establish the template for the one or more of the customer attributes of the customer corresponding to the selection by the customer of the third party recipients and the duration of access;

fill in the template, by the server, with the selection of the one or more of the customer attributes that are predetermined at least in part by the form provided by the one of the third party recipients;

with the server, provide access to the selection by the customer of the third party recipients to the template for the duration of access based on a time clock, wherein the template comprises the selection of the one or more of the customer attributes specified by the form provided by the one of the third party recipients;

provide the selection by the customer of the third party recipients access to the confidence score; and with the server, deny access to the template to the selection by the customer of the third party recipients after the duration of access has passed based on the time clock.

10. The system according to claim 9, wherein the template is predefined to comprise a group of the customer attributes of: age of the customer, education of the customer, income of the customer, photo of the customer, and gender of the customer.

11. The system according to claim 10, wherein the template is predefined to further comprise an additional group of the customer attributes of: home ownership status of the customer, and marital status.

12. The system according to claim 9, wherein the executable and operational data are further effective to cause the one or more processors to:
present to the customer a selectable selection of customer items that contain the one or more of the customer attributes that have been provided by the customer;
receive a selection of the customer items made by the customer; and
evaluate the customer items selected by the customer for the one or more of the customer attributes.

13. The system according to claim 12, wherein the executable and operational data are further effective to cause the one or more processors to:
organizing the customer items selected by the customer on a display; and
presenting the display to the customer.

14. The system according to claim 13, wherein the executable and operational data are further effective to cause the one or more processors to provide the customer an option of deleting one or more of the customer items from the selection by removing the one or more of the customer items graphically from the display.

15. The system according to claim 14, wherein the executable and operational data are further effective to cause the one or more processors to present the third party recipients with the selection of the customer items in a same organization as is displayed on the display.

16. The system according to claim 9, wherein the executable and operational data are further effective to cause the one or more processors to:
present to the customer a selectable selection of customer items that contain the one or more of the customer attributes that have been provided by the customer;
receive a selection of the customer items made by the customer;
evaluate the customer items selected by the customer for the one or more of the customer attributes;
organize the customer items selected by the customer on a display; and
present the display to the customer; and
wherein:
the template is predefined to comprise a group of the customer attributes of: age of the customer, education of the customer, income of the customer, photo of the customer, and gender of the customer;
the template is predefined to further comprise an additional group of the customer attributes of: home ownership status of the customer, and marital status;
the customer is provided an option of deleting one or more of the customer items from the selection by removing the one or more of the customer items graphically from the display; and
the third party recipients are presented with the selection of the customer items in a same organization as is displayed on the display.

17. A system for establishing a template for customer attributes of a customer that is seeking a loan, the system comprising:
a retail store;
one or more processors and one or more memory devices operably coupled to the one or more processors and storing executable and operational data, the executable and operational data effective to cause the one or more processors to:
receive a notification from the customer requesting that one or more of the customer attributes in a customer profile representative of the customer be made available to third party lender recipients in the template, wherein:
the customer is seeking a loan from the third party lender recipients;
a selection of the one or more of the customer attributes to be included in the template is predetermined at least in part by a form provided by one of the third party lender recipients; and
the one or more of the customer attributes in the customer profile are electronically stored by an entity that is different from the customer and the one or more of the customer attributes are based at least in part on activity of the customer on a computer network of the entity;
the template allows the one or more of the customer attributes to be organized into a useable format that can be conveyed to the third party lender recipients as directed by the customer in order to receive a beneficial relationship between the customer and at least one of the third party lender recipients;
evaluate the one or more of the customer attributes over time after the customer has updated the one or more of the customer attributes;
after the evaluation of the customer attributes over time, evaluate the one or more of the customer attributes for quality by determining that one or more digital copies of documents that include at least one of the one or more of the customer attributes are authentic;
provide a confidence score based at least in part on the quality and the evaluation of the one or more of the customer attributes over time;
present to the customer a group of selectable third party lender recipients to which the customer profile is to be made available, the group of selectable third party lender recipients comprising the third party lender recipients;
using an on-line web page interface having input and output options, receive a selection by the customer of the third party lender recipients for access to the customer profile;
using the on-line web page interface, receive a duration of access that the customer would like the customer profile to be available for access by selected third party lender recipients of the third party lender recipients;
store the selected third party lender recipients of the third party lender recipients in memory of a server;
store the duration of access in the memory of the server;
establish the template for the one or more of the customer attributes of the customer corresponding to the selected third party lender recipients of the third party lender recipients and the duration of access;
fill in the template, by the server, with the selection of the one or more of the customer attributes that are predetermined at least in part by the form provided by the one of the third party lender recipients;
with the server, provide access to the selected third party lender recipients of the third party lender recipients to the template for the duration of access based on a time clock, wherein the template comprises the selection of the one or more of the customer attributes specified by the form provided by the one of the third party lender recipients;
provide the selected third party lender recipients of the third party lender recipients access to the confidence score; and
with the server, deny access to the template to the selected third party lender recipients of the third party lender recipients after the duration of access has passed based on the time clock.

18. The system according to claim 17, wherein the executable and operational data are further effective to cause the one or more processors to:
present to the customer a selectable selection of customer items that contain the one or more of the customer attributes that have been provided by the customer;
receive a selection of the customer items made by the customer; and
evaluate the customer items selected by the customer for the one or more of the customer attributes.

19. The system according to claim 18, wherein the executable and operational data are further effective to cause the one or more processors to:
organize the customer items selected by the customer on a display; and
present the display to the customer.

20. The system according to claim 17 wherein the executable and operational data are further effective to cause the one or more processors to:
present to the customer a selectable selection of customer items that contain the one or more of the customer attributes that have been provided by the customer;
receive a selected selection of the customer items made by the customer;
evaluate the customer items in the selected selection for the one or more of the customer attributes;
organize the customer items in the selected selection on a display; and
present the display to the customer;
wherein:
the template is predefined to comprise a group of the customer attributes of: age of the customer, education of the customer, income of the customer, photo of the customer, and gender of the customer;
the template is predefined to further comprise an additional group of the customer attributes of: home ownership status of the customer, and marital status of the customer;
the customer is provided an option of deleting one or more of the customer items from the selection by removing the one or more of the customer items graphically from the display; and
the selected third party recipients are presented with the selection of the customer items in a same organization as is displayed on the display.

* * * * *